US012065606B2

(12) United States Patent
Li et al.

(10) Patent No.: US 12,065,606 B2
(45) Date of Patent: Aug. 20, 2024

(54) ANTI-FREEZING DISPERSANT AND MANUFACTURING PROCESS THEREOF

(71) Applicant: ECOLAB USA INC., St. Paul, MN (US)

(72) Inventors: Shiguang Li, Shanghai (CN); Meng Kong, Shanghai (CN); Qing Qing Yuan, Shanghai (CN)

(73) Assignee: ECOLAB USA Inc., St. Paul, MN (US)

( * ) Notice: Subject to any disclaimer, the term of this patent is extended or adjusted under 35 U.S.C. 154(b) by 289 days.

(21) Appl. No.: 17/580,556

(22) Filed: Jan. 20, 2022

(65) Prior Publication Data

US 2022/0235273 A1 Jul. 28, 2022

(30) Foreign Application Priority Data

Jan. 26, 2021 (CN) .......................... 202110102720.9

(51) Int. Cl.
*C09K 23/12* (2022.01)
*C08F 2/00* (2006.01)

(52) U.S. Cl.
CPC .............. *C09K 23/12* (2022.01); *C08F 2/005* (2013.01)

(58) Field of Classification Search
USPC .................................................. 252/75, 78.1
See application file for complete search history.

(56) References Cited

U.S. PATENT DOCUMENTS

| | | | |
|---|---|---|---|
| 3,632,510 A | 1/1972 | Lesuer | |
| 3,691,226 A | 9/1972 | Halvorson et al. | |
| 3,954,677 A * | 5/1976 | Law | C04B 24/22 |
| | | | 106/608 |
| 4,282,147 A | 8/1981 | Dieterich | |
| 4,297,259 A * | 10/1981 | Papalos | C08F 36/04 |
| | | | 524/457 |
| 4,421,668 A | 12/1983 | Cox et al. | |
| 4,657,689 A * | 4/1987 | Darden | C23F 11/10 |
| | | | 252/75 |
| 4,673,410 A | 6/1987 | Sandefur et al. | |
| 4,902,824 A | 2/1990 | Syrinek | |
| 5,009,669 A | 4/1991 | Jollenbeck et al. | |
| 5,176,753 A | 1/1993 | Brook | |
| 5,268,412 A | 12/1993 | Raynolds | |
| 5,650,072 A | 7/1997 | McClain et al. | |
| 5,746,924 A | 5/1998 | Cooper et al. | |
| 5,746,925 A | 5/1998 | Alper | |
| 7,531,584 B2 | 5/2009 | Kerns et al. | |
| 7,654,321 B2 | 2/2010 | Zazovsky et al. | |
| 7,992,653 B2 | 8/2011 | Zamora et al. | |
| 8,029,827 B2 | 10/2011 | Martin | |
| 8,067,629 B2 | 11/2011 | Tong | |
| 8,714,283 B2 | 5/2014 | Gatlin et al. | |
| 9,018,145 B2 | 4/2015 | Gatlin et al. | |
| 9,062,241 B2 | 6/2015 | Zamora et al. | |
| 9,402,396 B2 | 8/2016 | Morgenstern | |
| 9,686,979 B2 | 6/2017 | Norton et al. | |
| 9,961,899 B2 | 5/2018 | Ding et al. | |
| 10,001,769 B2 | 6/2018 | Huang et al. | |
| 10,494,564 B2 | 12/2019 | Hikem et al. | |
| 2004/0149174 A1 | 8/2004 | Farrington et al. | |
| 2005/0284340 A1 | 12/2005 | Vickers, Jr. et al. | |
| 2010/0258480 A1 | 10/2010 | Link et al. | |
| 2018/0010572 A1 | 1/2018 | Lomerson | |
| 2018/0105729 A1 | 4/2018 | Hamilton et al. | |
| 2018/0327673 A1 | 11/2018 | Bennett et al. | |
| 2019/0150444 A1 | 5/2019 | Liu et al. | |
| 2019/0316027 A1 | 10/2019 | Jones et al. | |
| 2019/0364888 A1 | 12/2019 | Urch et al. | |
| 2020/0102407 A1 | 4/2020 | Dufils et al. | |

FOREIGN PATENT DOCUMENTS

| | | |
|---|---|---|
| BR | 8307607 A | 10/1984 |
| BR | 9002547 A | 8/1991 |
| CN | 101103724 A | 1/2008 |
| CN | 101103726 A | 1/2008 |
| CN | 101156627 A | 4/2008 |
| CN | 101475351 A | 7/2009 |
| CN | 101589797 A | 12/2009 |
| CN | 101357856 B | 12/2010 |
| CN | 102241685 A | 11/2011 |
| CN | 102776791 A | 11/2012 |
| CN | 102850500 A | 1/2013 |
| CN | 102863878 A | 1/2013 |
| CN | 103059581 A | 4/2013 |

(Continued)

OTHER PUBLICATIONS

English machine translation of CN109821047A, published May 2019 (3 pages), retrieved from ESPACENET on Dec. 16, 2023. (Year: 2019).*

Butyl Cellosolve (TM) Product Data Sheet, Petronas Chemical Group Berhad, one page, Rev. Mar. 6, 2017. (Year: 2017).*

International Search Report and Written Opinion for International Application No. PCT/US2022/013199, mailed Jun. 22, 2022. 15 pages.

Madison et al., Cold Lake Blend diluted bitumen toxicity to the early development of Japanese medaka, Environmental Pollution, vol. 225, 2017, pp. 579-586, ISSN 0269-7491, https://doi.org/10.1016/j.envpol.2017.03.025.

Vlasov et al. (2012). Effects of antifreezes and bundled material on the stability and optical limiting in aqueous suspensions of carbon nanotubes. physica status solidi (b). 249. 2341-2344. 10.1002/pssb.201200089.

(Continued)

*Primary Examiner* — Fred M Teskin
(74) *Attorney, Agent, or Firm* — Eric D. Babych; Barnes & Thornburg LLP

(57) ABSTRACT

The present disclosure provides methods of treating industrial processes with compositions, methods of manufacturing the compositions, and various anti-freezing compositions suitable for use in the industrial processes. The anti-freezing dispersant compositions may include, for example, sulfonated dispersants and winterization solvents. The anti-freezing dispersant compositions may prevent fouling in the industrial processes.

12 Claims, No Drawings

(56) References Cited

FOREIGN PATENT DOCUMENTS

| | | |
|---|---|---|
| CN | 103243318 A | 8/2013 |
| CN | 103275687 A | 9/2013 |
| CN | 103478050 A | 1/2014 |
| CN | 103478052 A | 1/2014 |
| CN | 103558305 A | 2/2014 |
| CN | 103560247 A | 2/2014 |
| CN | 103896624 A | 7/2014 |
| CN | 104194891 A | 12/2014 |
| CN | 104559254 A | 4/2015 |
| CN | 104725285 A | 6/2015 |
| CN | 104946346 A | 9/2015 |
| CN | 105018161 A | 11/2015 |
| CN | 105038643 A | 11/2015 |
| CN | 105330573 A | 2/2016 |
| CN | 105421097 A | 3/2016 |
| CN | 105537616 A | 5/2016 |
| CN | 105731440 A | 7/2016 |
| CN | 105820757 A | 8/2016 |
| CN | 105925256 A | 9/2016 |
| CN | 106835721 A | 6/2017 |
| CN | 107094789 A | 8/2017 |
| CN | 107118410 A | 9/2017 |
| CN | 107227075 A | 10/2017 |
| CN | 107311796 A | 11/2017 |
| CN | 107365427 A | 11/2017 |
| CN | 107616993 A | 1/2018 |
| CN | 108395814 A | 8/2018 |
| CN | 108409170 A | 8/2018 |
| CN | 108485475 A | 9/2018 |
| CN | 108546177 A | 9/2018 |
| CN | 108559605 A | 9/2018 |
| CN | 108752007 A | 11/2018 |
| CN | 108841370 A | 11/2018 |
| CN | 109821047 A | 5/2019 |
| CN | 109970696 A | 7/2019 |
| CN | 110354889 A | 10/2019 |
| CN | 110436991 B | 7/2022 |
| DE | 10117303 A1 | 10/2002 |
| EP | 0872475 A2 | 10/1998 |
| EP | 1144569 A2 | 10/2001 |
| EP | 2212105 B2 * | 7/2019 ............ B32B 13/08 |
| FR | 2504549 A1 | 10/1982 |
| GB | 319273 A | 12/1930 |
| GB | 456214 A | 11/1936 |
| GB | 745927 A | 3/1956 |
| GB | 901038 A | 7/1962 |
| GB | 936079 A | 9/1963 |
| GB | 1035566 A | 7/1966 |
| GB | 1365081 A | 8/1974 |
| GB | 1440360 A | 6/1976 |
| GB | 1547323 A | 6/1979 |
| GB | 2221680 A | 2/1990 |
| GB | 2270914 A | 3/1994 |
| GB | 2337048 A | 11/1999 |
| KR | 20190091585 A | 8/2019 |
| MX | 2018008225 A | 9/2018 |
| WO | 1981001714 A1 | 6/1981 |
| WO | 1988003144 A1 | 5/1988 |
| WO | 2000043475 A2 | 7/2000 |
| WO | 2001034564 A1 | 5/2001 |
| WO | 2014098396 A1 | 6/2014 |
| WO | 2017021159 A1 | 2/2017 |
| WO | 2019002167 A1 | 1/2019 |
| WO | 2019006004 A1 | 1/2019 |

OTHER PUBLICATIONS

Xiao, et al. (2013). Screening of Additives for 1% Abamectin Microcapsules Suspension. Advanced Materials Research, 641-642, 939-942. https://doi.org/10.4028/www.scientific.net/amr.641-642.939.

* cited by examiner

ANTI-FREEZING DISPERSANT AND MANUFACTURING PROCESS THEREOF

BACKGROUND

Dispersant antifoulants that function as colloidal stabilizers that keep the foulants suspended and prevent them from depositing on equipment surfaces are used in various industrial applications. One such example is disclosed in U.S. Pat. No. 3,691,226, which describes the use of lignosulfonate metal salts to minimize foulant deposition on the heat transfer surface of the heater exchangers used to cool recycled water. Another example is disclosed in U.S. Pat. No. 5,650,072, which teaches the use of naphthalene sulfonate formaldehyde condensate polymer to prevent fouling of heat exchangers in an acrylonitrile stripper. U.S. Pat. No. 8,067,629 describes a process for the preparation of acrylonitrile and, more particularly, a process wherein an antifoulant dispersant comprising a polymer of styrene sulfonate is added to at least one step in the quench, the recovery, and the wastewater process of an acrylonitrile manufacturing process.

Sulfonated type dispersants are widely applied in the fields of cementing, textile and printing, pesticide, rubber, oil, and chemical production. Dispersants used in various manufacturing processes include sulfonated oils, sulfonated fatty acids, sulfated oils, sulfated fatty acids, naphthalene sulfonate formaldehyde, sulfonic acids, dodecylbenzene sulfonic acid, and lignosulfate metal salts. However, the dispersants are usually made in an aqueous solution form, which freeze at a temperature of around 0° C. This impacts their transportation, storage, and application.

U.S. Pat. No. 4,282,147 describes a method to form non-sedimenting dispersions in organic polyisocyanates by employing finely divided, solid aromatic isocyanatosulfonic acid uretdiones. Chinese Patent Application No. 201310733290.6 describes a method wherein ethanol or glycerol is used to purify sodium isopropyl sulfonate by removing sulfates. Chinese Patent Application No. 201510801942.4 describes a method of reducing sulfate content by adding hydrogen peroxide into sodium isopropyl sulfonate.

Embodiments of the present disclosure are directed to anti-freezing dispersant compositions and manufacturing processes thereof to address the issue of freezing, and thus allowing for the use of the dispersants at low temperatures.

BRIEF SUMMARY

A composition of certain embodiments of the present disclosure includes a sulfonated dispersant and a solvent. The composition may have a freezing point less than about 0° C.

In some aspects, the sulfonated dispersant is selected from the group consisting of sulfonated oils, sulfonated fatty acids, naphthalene sulfonate formaldehyde condensates, styrene sulfonate polymer, and any combination thereof.

In some aspects, the sulfonated dispersant is a sulfonic acid or sulfonate salt.

In some aspects, the sulfonated dispersant is from about 1 wt. % to about 60 wt. % of the composition.

In some aspects, the solvent is selected from water, hydroxyl-functionalized compounds, and any combination thereof.

In some aspects, the solvent is selected from the group consisting of water, ethylene glycol, glycerol, a glycol ether, and any combination thereof.

In some aspects, the solvent comprises alcohol in an amount ranging from about 1 wt. % to about 99 wt. %.

In some aspects, the solvent comprises ethylene glycol.

In some aspects, the sulfonated dispersant is a naphthalene sulfonate formaldehyde condensate.

In some aspects, the naphthalene sulfonate formaldehyde condensate is 2-naphthalenesulfonic acid, polymer with formaldehyde or salt thereof.

In some aspects, the salt of the 2-naphthalenesulfonic acid, polymer with formaldehyde is a sodium salt, a potassium salt, an ammonium salt, or mixtures thereof.

In some aspects, the composition comprises about 5 wt. % to about 20 wt. % of the sulfonated dispersant, the solvent comprises about 40 wt. % to about 60 wt. % of ethylene glycol and about 20 wt. % to about 55 wt. % water; or about 25 wt. % to about 45 wt. % of the sulfonated dispersant, the solvent comprises about 10 wt. % to about 30 wt. % of ethylene glycol and about 25 wt. % to about 65 wt. % water.

The present disclosure also provides methods of preparing the compositions disclosed herein. The methods may include dissolving the sulfonated dispersant in a solvent.

In certain aspects, a method of preparing a composition includes reacting a naphthalene sulfonate with formaldehyde to form a sulfonated dispersant; purifying the sulfonated dispersant by adding a solvent to form a solution; separating sediment from the solution; drying the solution to form a powder; and dissolving the powder in a second solvent.

In some aspects, the solvent is a poor solvent for sulfates.

In some aspects, the solvent is methanol.

The present disclosure also provides methods of reducing fouling in industrial processes. The methods may include adding a composition comprising a sulfonated dispersant and a solvent to an aqueous medium in the industrial process.

In some aspects, the industrial process is a chemical manufacturing process.

In some aspects, the chemical manufacturing process is an acrolein manufacturing process, acrylic acid and/or ester thereof manufacturing process, substituted acrylic acid and/or ester thereof manufacturing process, acrylic nitrile manufacturing process, vinyl acetate manufacturing process, or styrene manufacturing process.

A use of the composition disclosed herein for reducing fouling in a chemical manufacturing process is also provided.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

Although the present disclosure provides references to various embodiments, persons skilled in the art will recognize that changes may be made in form and detail without departing from the spirit and scope of the disclosure. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present invention. All publications, patent applications, patents and other references mentioned herein are incorporated by reference in their entirety.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. The term "about" refers to the cited value being within the errors arising from the standard deviation found in their respective testing measurements, and if those errors cannot be determined, then "about" may refer to, for example, within 5% of the cited value.

Further, where "about" is employed to describe a range of values, for example "about 1 to 5," the recitation means "1 to 5" and "about 1 to about 5" and "1 to about 5" and "about 1 to 5," unless specifically limited by context.

A solution that is "substantially free" of a specified compound or material may be free of that compound or material, or may have a minor amount of that compound or material present, such as through unintended contamination, side reactions, incomplete purification or test methods used. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially," the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Unless specified otherwise, all molecular weights referred to herein are weight average molecular weights and all viscosities were measured at about 25° C. with neat (not diluted) polymers.

In some embodiments, the process of ensuring that a dispersant used in an industrial process does not freeze at or about 0° C. comprises using an anti-freezing dispersant composition. In some embodiments, the concerned industrial processes maybe in the field of production and transportation of oil, cement, rubber, pesiticide, insecticide, textiles, and/or printing.

Described herein are compositions and methods that are used to keep the dispersant suspended and prevent its freezing at low temperatures. The anti-freezing dispersant composition may include a dispersant and a solvent.

An unpurified dispersant is a dispersant prior to any purification process. Unless otherwise specified, an unpurified dispersant is produced by one or more chemical processes involving one or more chemical reactants. After being subjected to one or more purifications steps, a purified dispersant is obtained.

The dispersant may be a sulfonated compound. The anti-freezing sulfonated dispersant may include a sulfonated compound and a solvent mixture. The anti-freezing sulfonated dispersants may not freeze or form sediment in the composition at low temperatures in the range of about 0° C. to about −25° C.

In some embodiments, the sulfonated compounds are sulfonated oils, sulfonated fatty acids, sulfated oils, sulfated fatty acids, naphthalene sulfonate formaldehyde condensates, styrene sulfonate polymers and their associated salts thereof, and mixtures and combinations thereof. Examples of sulfonated compounds included, but are not limited to, naphthalene sulfonate formaldehyde condensates and styrene sulfonate polymers.

In some embodiments, the sulfonated compounds could be in sulfonate acid form or salt thereof. In some embodiments, the weight percentage of the sulfonated dispersant in the composition is in the range of about 1 wt. % to about 80 wt. %. In some embodiments, the sulfonated dispersant is from about 1 wt. % to about 60 wt. % of the composition. In some embodiments, the sulfonated dispersant is from about 5 wt. % to about 60 wt. % of the composition. In some embodiments, the sulfonated dispersant is from about 10 wt. % to about 50 wt. % of the composition. In some embodiments, the sulfonated dispersant is from about 15 wt. % to about 50 wt. % of the composition. In some embodiments, the sulfonated dispersant is about 10 wt. %, about 15 wt. %, about 20 wt. %, about 30 wt. %, about 40 wt. %, about 50 wt. %, about 60 wt. %, or about 70 wt. % of the composition.

In some embodiments, the sulfonated compounds suitable for use herein have the general structure:

$$R—(SO_3)_nM$$

where R is a hydrocarbon group chosen from a linear or branched alkyl, aromatic, cycloalkyl, aryl, or alkenyl group.

As used herein "alkyl" or "alkenyl" group may have from 1 to about 29 carbon atoms; is partially or fully oxygenized. The term "cycloalkyl" by itself or as a part of another substituent refers to a cyclic alkyl group having the number of carbons designated and is a subset of the term "alkyl." Other subsets of the term "alkyl" include "linear" and "branched" alkyl groups which refer to two different types of acyclic alkyl groups. Examples of alkyl groups include methyl, ethyl, n-propyl, isopropyl, n-butyl, t-butyl, isobutyl, sec-butyl, cyclohexyl, cyclopentyl, (cyclohexyl)methyl, cyclopropylmethyl, bicyclo[2.2.1]heptane, bicyclo[2.2.2]octane, etc. In this list of examples, the methyl, ethyl, n-propyl, and n-butyl alkyl examples are also examples of "linear alkyl" groups. Similarly, isopropyl and t-butyl are also examples of "branched alkyl" groups. Cyclopentyl, cyclohexyl, (cyclohexyl)methyl, cyclopropylmethyl, bicyclo[2.2.1]heptane, bicyclo[2.2.2]octane are examples of "cycloalkyl" groups.

"Aryl" refers to a polyunsaturated, aromatic hydrocarbon group having a single ring (monocyclic) or multiple rings (bicyclic), which can be fused together or linked covalently. Aryl groups with 6-10 carbon atoms are suitable, where this number of carbon atoms can be designated by $C_{6-10}$, for example. Examples of aryl groups include phenyl and naphthalene-1-yl, naphthalene-2-yl, biphenyl and the like. Aryl groups can be substituted or unsubstituted, unless otherwise indicated. Substituted aryl may be substituted with one or more substituents. Suitable substituents for aryl include substituted or unsubstituted $C_{1-8}$ alkyl and those substituents as discussed above for substituted alkyl.

The "M" group may be H, an alkali metal, an alkaline earth metal, an alkali metal cation, an alkaline earth metal cation, an ammonium cation, or an alkyl ammonium cation and "n" ranges from 1 to about 10. In some aspects, n is 1, 2, 3, 4, 5, 6, 7, 8, 9, or 10.

In some aspects, the sulfonated dispersant is the compound of formula I.

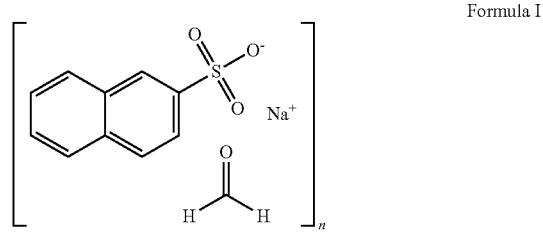

(CAS No. 36290-04-7)

Formula I

Formula I (CAS No. 36290-04-7)

The compound of formula I may be in the form of a potassium salt (CAS No. 67828-14-22) or an ammonium salt (CAS No. 9069-80-1).

In some embodiments, the sulfonated compound is a naphthalenesulfonic acid/formaldehyde condensation product (for example, compound of formula I) or a mixture of different salts thereof. For example, in some embodiments, a mixture of naphthalene sulfonic acid/formaldehyde sodium salt and naphthalene sulfonic acid/formaldehyde potassium salt is used as a dispersant.

Any method known to one of skill in the art may be used to prepare the sulfonated compounds. For example, sulfonated oils, sulfonated fatty acids, sulfated oils, sulfated fatty acids, naphthalene sulfonate formaldehyde, sulfonic acids, dodecylbenzene sulfonic acid, and lignosulfonate metal salts, and sulfonate polymers have been described in U.S. Pat. Nos. 5,650,072, 5,746,924, and 8,067,629, and each is incorporated herein by reference in their entireties These sulfonated type dispersants are admixed and/or dissolved in a solvent to form an anti-freezing composition. Examples of solvents include, but are not limited to, water, hydroxyl-functionalized compounds, and mixtures thereof. In some aspects, the solvent is an alcohol. In some aspects, the solvent is a dihydric alcohol selected from ethylene glycol, glycerol, a glycol ether, and any combination thereof.

The amount of alcohol in the solvent may range from about 1 wt. % to about 99 wt. %. In some aspects, the amount of alcohol in the solvent ranges from about 5 wt. % to about 30 wt. %. In some aspects, the amount of alcohol in the solvent is about 5 wt. %, about 7 wt. %, about 9 wt. %, about 10 wt. %, about 12 wt. %, about 14 wt. %, about 16 wt. %, about 18 wt. %, about 20 wt. %, about 22 wt. %, about 24 wt. %, about 26 wt. %, about 28 wt. %, or about 30 wt. %.

In some embodiments, the alcohol, glycol ethers and/or mixture may comprise about 15 wt. % to about 25 wt. % of the anti-freezing dispersant composition. In some embodiments, the alcohol, glycol ethers and/or mixture may comprise about 32 wt. % to about 42 wt. % of the anti-freezing dispersant composition.

In some embodiments, the solvent includes, but is not limited to, water and an alcohol. The alcohol may dissolve the sulfonated compounds at the low temperature with no remaining sediment.

In some embodiments, ethylene glycol is the preferred alcohol.

In some embodiments, the solvent may comprise ethylene glycol. The ethylene glycol may comprise about 20 wt. % to about 80 wt. % of the solvent mixture.

In some embodiments, the ethyl glycol may comprise about 15 wt. % to about 25 wt. % of the anti-freezing dispersant composition. In some embodiments, the ethyl glycol comprises about 32 wt. % to about 42 wt. % of the anti-freezing dispersant composition.

In some embodiments, the sulfonated dispersant may comprise about 15 wt. % to about 35 wt. % of the anti-freezing dispersant composition. In some embodiments, the sulfonated dispersant may comprise about 55 wt. % to about 85 wt. % of the anti-freezing dispersant composition.

In some embodiments, the sulfonated dispersant may comprise about 25 wt. % to about 35 wt. % of the anti-freezing dispersant composition. In some embodiments, the sulfonated dispersant may comprise about 15 wt. % to about 25 wt. % of the anti-freezing dispersant composition.

In some embodiments, the anti-freezing dispersant composition may comprise about 31.5 wt. % of the sulfonated dispersant and about 19 wt. % of the alcohol.

In some embodiments, the anti-freezing dispersant composition may consist of about 31.5 wt. % of the sulfonated dispersant, about 49.5 wt. % water and about 19 wt. % the alcohol. This composition does not freeze at a temperature of about −15° C.

In certain embodiments, the anti-freezing dispersant composition may comprise about 18 wt. % of the sulfonated dispersant and about 37 wt. % the alcohol.

In certain embodiments, the anti-freezing dispersant composition may consist of about 18 wt. % of the sulfonated dispersant, about 45 wt. % water and about 37 wt. % the alcohol. This composition does not freeze at a temperature of about −25° C.

In some embodiments, the compound of formula I may comprise about 15 wt. % to about 35 wt. % of the anti-freezing dispersant composition. In some embodiments, the compound of formula I may comprise about 55 wt. % to about 85 wt. % of the anti-freezing dispersant composition.

In some embodiments, the ratio of ethylene glycol to water in the anti-freezing dispersant composition is in the range of 0 to 5.0.

Any method known to one of skill in the art may be used to prepare the anti-freezing dispersant composition. In some embodiments, the anti-freezing dispersant composition may be produced by a manufacturing process that includes the production of the sulfonated dispersant, purification of the sulfonated dispersant, drying of the pure sulfonated dispersant, and dissolution of the sulfonated dispersant in a solvent.

In some embodiments, the production of the sulfonated dispersant may be carried out by the process of sulfonation with sulfuric acid.

In some embodiments, the production of the sulfonated dispersant may be carried out by the process of condensation with formaldehyde.

In some embodiments, the production of the sulfonated dispersant maybe carried out by the process of neutralization with an alkali liquor or a mixture of alkali liquors and drying into powder.

In some embodiments, alkali mixture of potassium hydroxide and sodium hydroxide is added to adjust the pH in the range of about 5 to about 11 during the sub-process of neutralization. In some embodiments, the pH ranges from about 6 to about 9. The molar ratio of potassium hydroxide to sodium hydroxide is in the range of 100:1 to 1:100, such as 3:1 to 10:1.

In some embodiments, the raw sulfonated type dispersant could be a mixture of the formed sulfonates produced by any of the previously mentioned methods.

In some embodiments, the purification of the raw sulfonated dispersant may be done by adding a poor solvent, such as methanol, for the sulfates into the dispersant solution and blending the mixture to form a sediment. Other poor solvents include, but are not limited to, ethanol, propyl alcohol, and isopropanol.

In some embodiments, the content of sulfates in the dispersant may be decreased by adding calcium hydroxide or calcium oxide to form calcium sulfate. However, the residual calcium ions have negative effects (such as fouling) during the subsequent applications.

In some embodiments, methanol is used as a poor solvent. It can reduce the amount of inorganic impurities in the dispersant to about 5 wt. % or less. In some embodiments, the amount of methanol in the solvent may be in the range of about 10 wt. % to about 90 wt. %, such as about 20 wt. % to about 50 wt. %.

In some embodiments, after the formed sediment is separated, the solution is dried to form a purified dispersant. In some embodiments, the aqueous methanol can be recycled for use in the purification process.

In some embodiments, the purified dispersant is dissolved in a solvent mixture of water and polyhydric alcohols and mixed to a desirable concentration.

In another embodiment, the anti-freezing sulfonated type dispersant may be produced by a manufacturing process different from that described above.

The anti-freezing dispersant composition disclosed herein may be added to industrial processes to reduce fouling. The composition may be added to chemical manufacturing processes, such as acrolein, acrylic acids and/or esters thereof, substituted acrylic acids and/or esters thereof, acrylic nitrile, vinyl acetate, styrene, etc. The dispersant can help remove foulant from the system and extend the run length.

The anti-freezing dispersant composition can be injected by a pump or flow meter at any position in the process where foulant is generated or may accumulate. Examples of locations where foulant is generated or may accumulate include, but are not limited to, a recovery column, four-stage evaporator, purification column, or reboiler. The amount of composition added to the process may range from about 1 ppm to about 1000 ppm.

EXAMPLES

Experimentation was done to determine the parameter ranges that provided an appropriate anti-freezing dispersant composition. The freezing point of different compositions made with varying wt. % of sulfonated dispersant, such as the compound of formula I, and varying wt. % of solvent, such as ethylene glycol, was determined. The freezing point of those compositions was determined after multiple freeze thaw cycles. In some embodiments it was determined after at least 3 freeze thaw cycles.

Determination of an ideal anti-freezing dispersant composition is done after ensuring that the freezing point of the composition is less than or equal to about −18° C., and that the composition can survive without any change in the its freezing point after at least 3 freeze thaw cycles at about −18° C. A composition "survives" if the composition can be restored back to liquid state at a temperature higher than the freezing point without sediment. When the temperature reaches freezing point, it can freeze again.

In one embodiment, an anti-freezing dispersant composition may include about 31.5 wt. % of purified compound of formula I, about 49.5 wt. % water and about 19 wt. % the ethylene glycol. This composition did not freeze at a temperature of about −15° C.

In one embodiment, an anti-freezing dispersant composition may include about 9 wt. % of purified compound of formula I, about 45.5 wt. % water and about 45.5 wt. % of ethylene glycol. This composition did not freeze at a temperature of about −25° C.

Sululfonates were manufactured by reacting naphthalene with sulfuric acid to form naphthalene sulfonic acid at about 120° C. by a sulfonation reaction and followed by a hydrolyzing reaction. Then, about 37 wt. % formaldehyde was added. An alkali mixture with NaOH and KOH (molar ratio of K/Na was about 3:1) was added for neutralization and the pH was adjusted to about 7 to about 9. The reaction product was then dried and added to water to make a solution.

About 10 wt. % of methanol based on the solution weight was added into the aqueous solution of the reaction product to facilitate formation of sulfate sediment. The sediment was filtered and dried to obtain the purified dispersant. The sulfate content was about 15 wt. % in the solid as calculated by $Na_2SO_4$.

The purified dispersant was dissolved into about 72.3 wt. % water and about 27.7 wt. % of ethylene glycol to produce an about 31.5 wt. % solution with blending. The formed dispersant solution did not freeze at about −15° C. and no sediment formed in solution for about 1 month.

In an additional example, the sulfonate compound was manufactured by reacting naphthalene with about 98 wt. % sulfuric acid to form naphthalene sulfonic acid at about 120° C. and followed by a hydrolyzing reaction. Then, about 37 wt. % formaldehyde was added, followed by adding an alkali mixture of NaOH and KOH (molar ratio of K/Na is 7:1) for neutralization. The pH was adjusted to about 7 to about 9. The product was filtered and dried to form dispersant powder. The powder was dissolved into 45 wt. % aqueous solution.

About 15 wt. % of methanol based on the solution weight was added into the aqueous solution to facilitate formation of sulfate sediment. The sediment was filtered and the rest of the solution was dried to obtain the purified solid dispersant. The sulfate content was about 18 wt. % in the solid as calculated by $Na_2SO_4$.

The purified dispersant was dissolved into about 72.3 wt. % water and about 27.7 wt. % of ethylene glycol to produce an about 31.5 wt. % solution. The formed dispersant solution did not freeze at about −10° C. and no sediment formed in solution for about 1 month.

In a further example, the sulfonated compound was manufactured by reacting naphthalene with about 98 wt. % sulfuric acid to form naphthalene sulfonic acid at about 120° C. and followed by a hydrolyzing reaction. Then, about 37 wt. % formaldehyde was added, followed by adding an alkali mixture of NaOH and KOH (molar ratio of K/Na is 7:1) for neutralization. The pH was adjusted to about 7 to about 9. The product was filtered and dried to form dispersant powder. The powder was dissolved into about a 45 wt. % aqueous solution.

About 15 wt. % of methanol based on the solution weight was added into the aqueous solution to facilitate formation of sulfate sediment. The sediment was filtered and the rest solution of the solution was dried to obtain the purified solid dispersant. The sulfate content was about 18 wt. % in the solid as calculated by $Na_2SO_4$.

The purified dispersant was dissolved into about 78.1 wt. % water and 21.9 wt. % of ethylene glycol to produce an about 31.5 wt. % solution. The formed dispersant solution did not freeze at about −12° C. and no sediment formed in solution for about 1 month.

In an additional example, the sulfonate compound was manufactured by reacting naphthalene with about 98 wt. % sulfuric acid to form naphthalene sulfonic acid at about 120° C. and followed by a hydrolyzing reaction. Then, about 37 wt. % formaldehyde was added, followed by adding an alkali mixture of NaOH and KOH (molar ratio of K/Na is 7:1) for neutralization. The pH was adjusted to about 7 to about 9. The product was filtered and dried to form dispersant powder. The powder was dissolved into an about 45 wt. % aqueous solution.

About 15 wt. % of methanol based on the solution weight was added into the aqueous solution to facilitate formation of sulfate sediment. The sediment was filtered and the rest solution of the solution was dried to obtain the purified solid dispersant. The sulfate content was about 18 wt. % in the solid as calculated by $Na_2SO_4$.

The purified dispersant was dissolved into about 50 wt. % water and 50 wt. % of ethylene glycol to produce an about 9 wt. % solution. The formed dispersant solution did not freeze at about −25° C. and no sediment formed in solution for about 1 month.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a solvent" is intended to include "at least one solvent" or "one or more solvents."

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A composition, comprising:
    a sulfonated dispersant; and
    a solvent,
   wherein the composition has a freezing point less than about 0° C., further wherein the composition comprises about 5 wt. % to about 20 wt. % of the sulfonated dispersant and the solvent comprises about 40 wt. % to about 60 wt. % of ethylene glycol and about 20 wt. % to about 55 wt. % water or about 25 wt. % to about 45 wt. % of the sulfonated dispersant and the solvent comprises about 10 wt. % to about 30 wt. % of ethylene glycol and about 25 wt. % to about 65 wt. % water.

2. The composition of claim 1, wherein the sulfonated dispersant is selected from the group consisting of sulfonated oils, sulfonated fatty acids, naphthalene sulfonate formaldehyde condensates, styrene sulfonate polymer, and any combination thereof.

3. The composition of claim 1, wherein the sulfonated dispersant is a sulfonic acid or sulfonate salt.

4. The composition of claim 1, wherein the sulfonated dispersant is a naphthalene sulfonate formaldehyde condensate.

5. The composition of claim 4, wherein the naphthalene sulfonate formaldehyde condensate is 2-naphthalenesulfonic acid, polymer with formaldehyde or salt thereof.

6. The composition of claim 5, wherein the salt of the 2-naphthalenesulfonic acid, polymer with formaldehyde is a sodium salt, a potassium salt, an ammonium salt, or mixtures thereof.

7. A method of preparing a composition, comprising:
    reacting a naphthalene sulfonate with formaldehyde to form a sulfonated dispersant;
    purifying the sulfonated dispersant by adding a solvent to form a solution;
    separating a sediment from the solution;
    drying the solution to form a powder; and
    dissolving the powder in a second solvent.

8. The method of claim 7, wherein the solvent is a poor solvent for sulfates.

9. The method of claim 7, wherein the solvent is methanol.

10. A method of reducing fouling in an industrial process comprising:
adding a composition comprising a sulfonated dispersant and a solvent to an aqueous medium in the industrial process, wherein the composition comprises about 5 wt. % to about 20 wt. % of the sulfonated dispersant and the solvent comprises about 40 wt. % to about 60 wt. % of ethylene glycol and about 20 wt. % to about 55 wt. % water or about 25 wt. % to about 45 wt. % of the sulfonated dispersant and the solvent comprises about 10 wt. % to about 30 wt. % of ethylene glycol and about 25 wt. % to about 65 wt. % water.

11. The method of claim 10, wherein the industrial process is a chemical manufacturing process.

12. The method of claim 11, wherein the chemical manufacturing process is an acrolein manufacturing process, acrylic acid and/or ester thereof manufacturing process, substituted acrylic acid and/or ester thereof manufacturing process, acrylonitrile manufacturing process, vinyl acetate manufacturing process, or styrene manufacturing process.

* * * * *